July 3, 1956 R. J. STOUDER 2,752,930
AUTOMATIC SHUT-OFF FOR VALVES AND THE LIKE
Filed Dec. 10, 1953
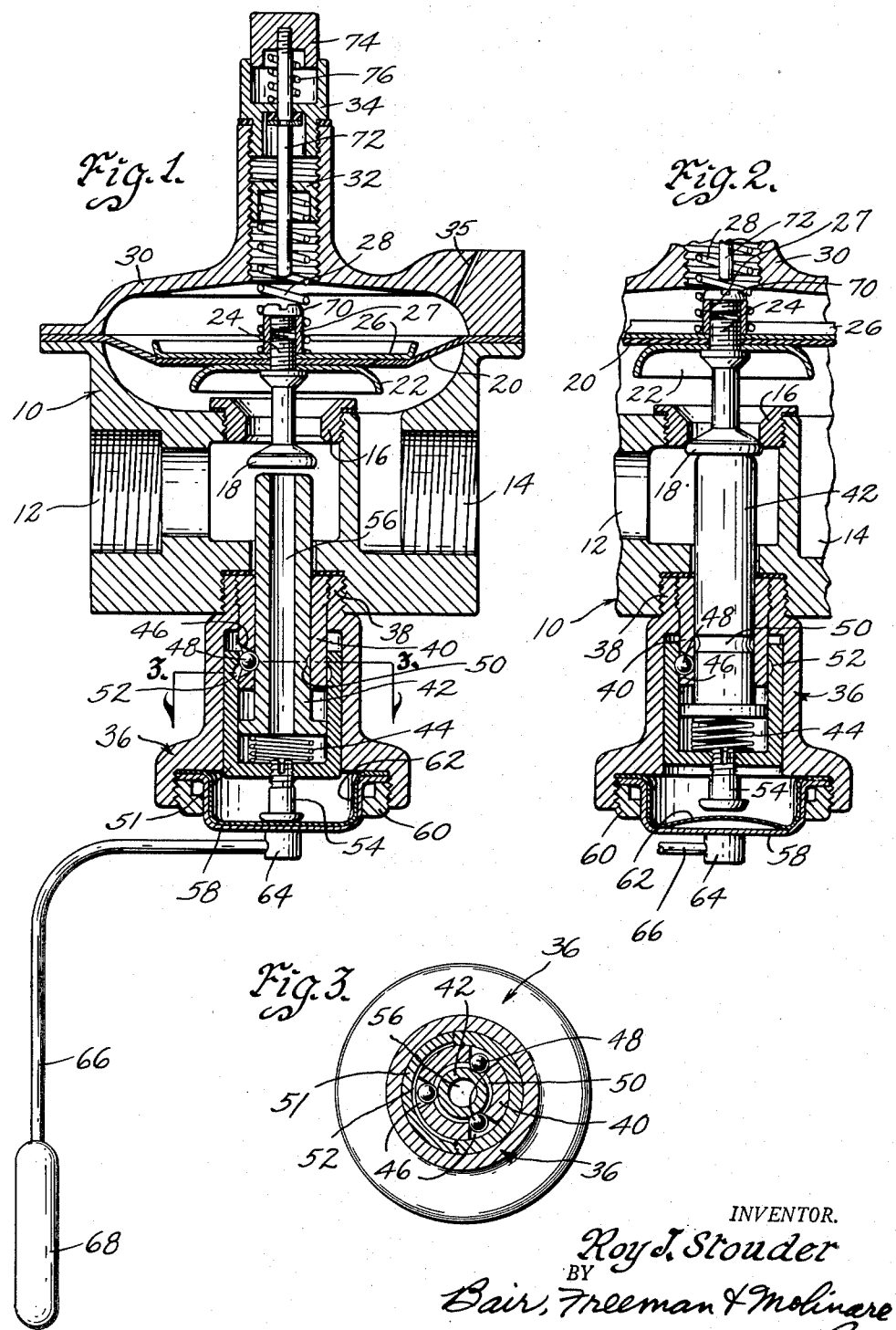
INVENTOR.
Roy J. Stouder
BY
Bair, Freeman & Molinare
Attys.

United States Patent Office 2,752,930
Patented July 3, 1956

2,752,930

AUTOMATIC SHUT-OFF FOR VALVES AND THE LIKE

Roy J. Stouder, Goshen, Ind., assignor to Penn Controls, Inc., Goshen, Ind., a corporation of Indiana Application December 10, 1953, Serial No. 397,304

3 Claims. (Cl. 137—80)

This invention relates to an automatic shut-off which may be in the form of a unit mounted on a pressure regulator or other type of valve and which is operable upon a predetermined condition occurring such as excess temperature or pressure to move the regulator or other valve to shut-off position requiring manual resetting before the valve can be put back into operation.

One object of the invention is to provide a comparatively simple and inexpensive safety shut-off unit adapted to be connected to the body of a regulator valve or the like, which unit is self contained and has means to coact with the valve in the valve body and move it to the off position upon the occurrence of a predetermined condition. The shut-off unit then keeps the valve in that position until reset whereupon it is again ready for an automatic shut-off operation when the predetermined condition reoccurs.

Another object is to provide a safety shut-off unit in the form of a body having therein a shut-off element projectable from the body to engage a valve plug or the like and seat it, a spring within the body being operable to perform this function, and means being provided to lock the spring against operation, such means being specifically a pair of grooved elements and a system of balls coacting with the grooves for locking and unlocking the shut-off element with respect to the body of the unit.

A further object is to provide means for relatively engaging balls with a certain groove and disengaging them from a certain other groove so that the spring can then act in its intended capacity to close the valve, manually operable reset means being provided to open the valve again and at the same time disengage the balls from the other groove and reengage them with the initial groove and thus reset the device for a subsequent safety operation.

Still a further object is to provide a simple means to relock the shut-off element in an inoperable position when it is manually pushed to a reset position, this means involving the coaction of the balls with a groove of a tripping sleeve which may be actuated by a temperature or pressure responsive power element to effect the automatic shut-off operation.

With these and other objects in view, my invention consists in the construction, arrangement and combination of the various parts of my automatic shut-off for valves and the like whereby the objects contemplated are attained as hereinafter more fully set forth, pointed out in my claims and illustrated in the accompanying drawings wherein:

Fig. 1 is a cross sectional view of a regulator valve to which my automatic shut-off has been applied, the parts being shown in the normal operating position, i. e., with the regulator valve open and regulating the flow of gas or the like therethrough.

Fig. 2 is a similar sectional view of a portion of Fig. 1 showing the automatic shut-off in the tripped position; and Fig. 3 is a horizontal sectional view taken on the line 3—3 of Fig. 1 and illustrates details of the ball and groove arrangement.

On the accompanying drawing I have used the reference numeral 10 to indicate a valve body such as one for a pressure regulator or any other type of valve. The valve body illustrated has an inlet 12 and an outlet 14 between which are located a seat 16. A valve plug 18 is adapted to cooperate with the seat 16 in regulation of the flow of gas or the like through the valve body 10, and is under control of a diaphragm 20 which is responsive to the outlet pressure within the valve body.

A spring 28 is provided for normally forcing the diaphragm 20 downwardly against the action of the incoming pressure and is enclosed in a diaphragm cover which also serves to seal the peripheral edge of the diaphragm 20 with respect to the valve body 10. The spring 28 may be adjusted by means of a nut 32 threaded in an upwardly extending neck of the diaphragm cover 30. This neck is closed by a closure plug 34 and the diaphragm cover is vented as indicated at 35.

Discs 22 and 26 are held to opposite faces of the diaphragm 20 by means of a threaded portion 24 on the valve plug member 18 threaded into a sleeve 27 which sleeve serves as a locator for the lower end of the spring 28. Further details of the upper portion of the valve will be referred to hereinafter.

My automatic shut-off unit includes a body 36 which is adapted to be mounted in depending relation to the valve body 10 by means of a threaded portion 38 screwed into threads of the body 10. Within the body 36 a sleeve 40 depends from its upper end and a somewhat longer sleeve 42 is slidable therein. A spring 44 is located below the sleeve 42 and normally biases it upwardly as will hereinafter appear.

Three tapered openings 46 are provided in the sleeve 40 to loosely receive balls 48. The sleeve 42 has an annular groove 50 for these balls and is slidable in the body 36. Surrounding the sleeve 40 is an actuating sleeve 51 having an internal annular groove 52 to also at times receive the balls 48.

An adjusting screw 54 is threaded in the lower end of the sleeve 51 and is adapted to be contacted by a diaphragm 62 in a diaphragm housing 58. The sleeve 42 has a bore 56 to gain access to the adjusting screw while the shut-off unit is disconnected from the valve body 10. The housing 58 is secured in the body 36 by a retainer ring 60 and has a fitting 64 thereon connected by a capillary tube 66 to a temperature sensing bulb 68. This is merely one representation of a condition responsive element that may be used for engaging the adjusting screw 54 and actuating the sleeve 51 as will hereinafter be described.

For resetting the shut-off unit I provide a resetting stem 72 slidable in the cap 34 and provided with a button-like head 74. A spring 76 normally holds the stem upwardly and the head may be depressed manually against the action of the spring whereupon the lower end of the stem will engage a screw 70 in the upper end of the sleeve 27.

*Practical operation*

In the operation of my automatic shut-off, assuming the parts in the position shown in Fig. 1, the automatic shut-off is inoperative by reason of the sleeve 42 being held in lowered position by the balls 48 entering the groove 50 and held in this groove by that portion of the actuating sleeve 51 above the groove 52 therein.

The position of the parts of the power element 58—62 indicates that normal temperatures are involved and when the temperature becomes excessive so that shut-off is desired the diaphragm 62 will bow upwardly thus driving the adjusted screw 54 and also the actuating sleeve 51 upwardly. Soon the groove 52 will register with the balls 48 and they can then move outwardly in the tapered openings 46 under the action of the spring 44 and the groove 50 of the sleeve 42 camming the balls outwardly into the groove 52.

In Fig. 2 the sleeve 42 has been moved upwardly by the spring 44 after the balls enter the groove 52 as just described and accordingly has engaged the shut-off plug 18 of the regulating valve and closed it against the seat 16 so that the valve is locked in the off position until the shut-off unit is reset.

Resetting is accomplished by depressing the head 74 which will move the entire assembly of 72, 70, 27, 26, 20, 22, 18 and 42 downwardly against the action of the spring 44 and as soon as the groove 50 is opposite the balls 48 the balls will move inwardly because of the action of the spring 44 tending to force the actuating sleeve 51 downwardly which causes the groove 52 to cam the balls 48 inwardly. The actuating sleeve 51 will thereafter move downwardly and assume the position shown in Fig. 1, providing of course the excessive temperature condition that bowed the diaphragm 62 upwardly to the position shown in Fig. 2 has receded and permitted the diaphragm to move back to its initial position shown in Fig. 1.

The foregoing described invention, it will be obvious, serves as a high limit shut-off. On an increase in heat on the temperature responsive bulb 68 it will operate in its shut-off capacity. The valve will then remain shut off until manual reset effects the resetting thereof as described. The temperature sensing bulb 68 may be placed in a bonnet of a furnace for a high limit shut-off, inside or against the tank of a hot water heater for the same effect, or many other types of safety shut-off installations are possible.

Some changes may be made in the construction and arrangement of the parts of my automatic shut-off for valves and the like without departing from the real spirit and purpose of my invention, and it is my intention to cover by my claims any modified forms of structure or use of mechanical equivalents which may reasonably be included within their scope.

I claim as my invention:

1. In an automatic shut-off for regulator valves and the like, a shut-off unit adapted to be attached to the body of a regulator valve in position opposite the valve plug thereof, said unit comprising a body, a shut-off element projectable from said unit body to engage the valve plug and seat the same on its valve seat, a spring within said unit body tending to cause such projection, means to normally retain said shut-off element against the bias of said spring comprising a first sleeve having a series of radial openings therein, balls movable in said openings, said first sleeve being stationarily mounted in said unit body and an axially movable sleeve, said shut-off element and said axially movable sleeve being grooved to selectively receive said balls, automatic means to move said axially movable sleeve to a position to receive the balls thereby releasing said shut-off element to permit said spring to function, condition responsive means carried on said shut-off unit body to operate said automatic means, and manual means to move said shut-off element and thereby reset it by reengagement of said balls in the groove of said shut-off element.

2. In a shut-off for valves and the like, a shut-off unit adapted to be attached to the body of a valve in position opposite the valve plug thereof, said unit comprising a body, a shut-off element projectable from said unit body to engage the valve plug and seat the same on its valve seat, a spring within said unit body tending to cause such projection, means to normally retain said shut-off element against the bias of said spring comprising a sleeve stationary in said unit body, radially movable balls in the wall of said first sleeve and an axially movable sleeve, said shut-off element and said last sleeve having grooves to selectively receive said balls, automatic means to move said last sleeve to a position to receive the balls thereby releasing the balls from the groove of said shut-off element to permit the spring to move it to shut-off position, and condition responsive means carried on said shut-off unit body to operate said automatic means.

3. In a device of the class described, a shut-off unit for a valve comprising a body, a shut-off element projectable from said body to engage the valve plug of the valve and seat it, means within said body biasing said shut-off element in one direction to valve closing position, means to normally retain said shut-off element against the bias of said biasing means comprising a pair of sleeves surrounding said shut-off element, one of said sleeves being stationary and the other movable, said first means biasing said other sleeve in an opposite direction, the stationary sleeve having radial openings therethrough, balls located in said openings, said shut-off element and said other of said sleeves having grooves therein to selectively receive said balls, condition responsive means to move said other sleeve against the bias of said first means for registering its groove with said balls, and manual resetting means for registering the groove of said shut-off element with said balls to release said other sleeve so that it can be moved by said first means to initial position for another and subsequent automatic shut-off operation.

References Cited in the file of this patent
UNITED STATES PATENTS

| 626,594 | Chapman | June 6, 1899 |
| 2,343,495 | Campbell | Mar. 7, 1954 |

FOREIGN PATENTS

| 501,595 | Germany | July 3, 1930 |